Nov. 2, 1971  D. D. LITT ET AL  3,616,569
BALLOON AND VALVE ASSEMBLIES AND SUPPLY THEREOF
FOR DISPENSING MACHINE

Filed June 30, 1969  2 Sheets-Sheet 1

INVENTORS
DONALD D. LITT
DAVID B. JAROFF

BY

ATTORNEY

INVENTORS
DONALD D. LITT
DAVID B. JAROFF

BY

*ATTORNEY*

United States Patent Office 3,616,569
Patented Nov. 2, 1971

3,616,569
BALLOON AND VALVE ASSEMBLIES AND SUPPLY THEREOF FOR DISPENSING MACHINE
Donald D. Litt, Scarsdale, and David B. Jaroff, New York, N.Y., assignors to Miner Industries, Inc., New York, N.Y.
Filed June 30, 1969, Ser. No. 837,691
Int. Cl. A63h 3/06
U.S. Cl. 46—90
9 Claims

ABSTRACT OF THE DISCLOSURE

A balloon assembly particularly suited for dispensing by a vending machine has a one-piece valve body elastically engaged by the neck of a balloon to normally seal radial passages opening from an axial bore extending from the outer end of the valve body. The surface of the valve body is given a particular configuration to retain the balloon neck thereon during inflation, and the openings of the radial passages are located to permit such inflation and to retain the inflating gases in the balloon even when comprised of a mixture of air and helium. A plurality of such balloon assemblies are releasably held in the spaced openings of a flexible belt to serve as a supply of balloons for a balloon dispensing or vending machine, with the edge of each belt opening ensuring the retention of the balloon neck on the respective valve during inflation.

---

This application is a continuation-in-part of our copending U.S. application Ser. No. 617,595, filed Feb. 21, 1967.

This invention relates generally to a balloon assembly comprised of a conventional elastic balloon having a valve inserted in its neck to prevent the escape from the balloon of inflating gases supplied to the balloon through the valve, and to a source of supply of such balloon assemblies adapted to be dispensed by a vending machine.

An object of this invention is to provide a balloon assembly of the described character which is particularly adapted to be dispensed in inflated condition by a vending machine, for example, of the type fully disclosed in U.S. Pat. No. 3,380,490 which issued on application Ser. No. 519,992, filed Jan. 11, 1966, and has a common assignee herewith.

More particularly, it is an object of the invention to provide a simple and inexpensive valve for a balloon assembly of the described character, which valve is securely held in the neck of the balloon to resist separation therefrom even when the balloon is inflated by gases under a relatively high pressure so as to reduce the time required for inflation.

A further object is to provide a source of supply of the balloon assemblies for dispensing from a vending machine, for example, of the type mentioned above, and in which such balloon assemblies are separably held by a flexible belt which functions to convey the balloon assemblies in the vending machine and to prevent separation of each balloon from its valve during inflation of the balloon.

A still further object is to provide a valve for a balloon assembly of the described character which is adapted to have the flexible elongated element wound on a portion of the valve projecting from the balloon neck so that such elongated flexible element will not interfere with the efficient dispensing of the balloon assembly.

In accordance with an aspect of this invention, a source of supply of balloons for a balloon dispensing or vending machine comprises an elongated, flexible belt having openings spaced apart therealong and balloon assemblies releasably mounted in such belt openings and each including an elastic balloon and a one-piece valve inserted in the neck of the balloon and through which the latter may be inflated while held in the belt, whereupon the assembly can be separated from the belt and the inflating gas is retained in the balloon by the associated valve. The one-piece valve for the foregoing purpose has an axial bore opening only at the outer end of the valve body which projects from the balloon neck and radial passages extending from such bore to openings at the surface of the valve body against which the balloon neck normally elastically seats to seal the passage openings, with the balloon neck being deflectable away from said openings when gas under pressure is supplied to said bore for inflating the balloon. Further, between the passage openings and the outer end of the valve body the latter has shoulder defining means, such as a flange or circumferential series of flange sections, over which extends the usual rim at the mouth of the balloon neck, and the edge of the belt opening frictionally engages the balloon neck at a circumferential zone corresponding to a location on the valve body between the passage openings and the shoulder defining means, whereby to surely prevent removal of the balloon neck from the valve body during the inflating operation.

According to another feature of this invention, the valve body of each balloon assembly has a radially outward opening recess, for example, defined by an external, annular groove adjacent the shoulder defining flange or between the circumferential series of flange sections and a similar series of flange sections spaced therefrom, which recess is located in correspondence with the circumferential zone where the balloon neck is engaged by the edge of the respective belt opening.

Further, in order to permit efficacious filling of the balloon by the inflating gas and sealing of such gas in the balloon, particularly when the gas is helium or a mixture of air and helium, the passage openings are located at distances from the inner or closed end of the valve body and from the aforementioned annular recess which positions the belt with respect thereto, which distances are desirably in the ratio of approximately 5:2.

The above, and other objects, features and advantages of the invention, will be apparent in the following detailed description of illustrative embodiments thereof which is to be read in connection with the accompanying drawings, wherein.

Figure 1:
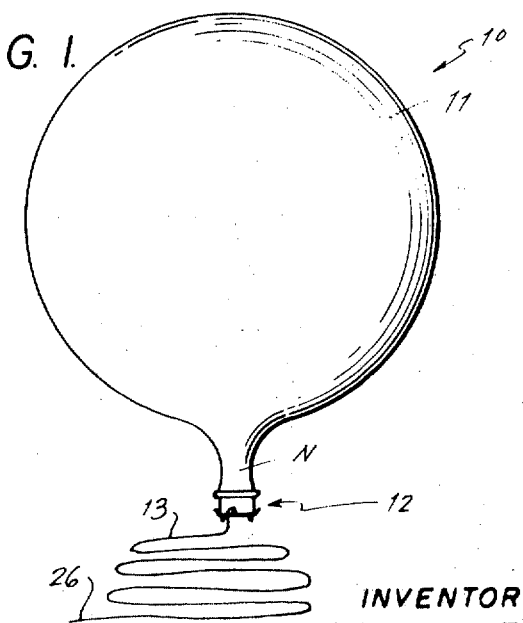
FIG. 1 is an elevational view of a balloon assembly embodying this invention and shown with the balloon thereof in inflated condition.

Referring to the drawing in detail, and initially to FIG. 1 thereof, it will be seen that the balloon assembly 10 according to a first embodiment of this invention generally comprises a conventional balloon 11 of rubber or other elastic material, a valve 12 for retaining the balloon in its inflated condition after the balloon has been inflated by gases under pressure, for example, a mixture of helium and air, admitted to the ballon through the valve, and a string, cord or other elongated flexible element 13 secured at one end to valve 12 to provide means by which the inflated balloon may be held.

The valve 12 is shown to consist of a generally cylindrical body 14 molded or otherwise formed of a suitable plastic material and having an axial bore 15 (FIGS. 3, 4 and 5) which opens at only one end 16 of the valve body. Radial passages 17 extend from bore 15 to openings at the outer surface of valve body 14, which openings are located closer to the closed end 18 of body 14 than to the open end 16. An annular, external shoulder 19 is directed radially outward on body 14 between the openings of radial passages 17 and the end 16 of the valve body and faces toward end 16. As shown, shoulder 19 may be defined by an annular flange 20 directed outwardly from body 14 intermediate the ends thereof. Further, a radially outward opening recess 21 (FIG. 2) is formed in the outer surface of the valve body between the openings of radial passages 17 and shoulder 19, for example, by annularly tapering, undercutting or grooving the surface of body 14 adjacent flange 20.

The outer surface of valve body 14 between flange 20 and closed end 18 is diametrically dimensioned so as to be substantially wider than the relaxed or molded diameter of the neck N of balloon 11 which has the usual thickened rim R extending around its open mouth. Thus, when the valve body 14 is extended, at its closed end 18, into the mouth of balloon 11 to an extent sufficient to engage the rim R over annular shoulder 19, the balloon neck N is stretched around such outer surface of the valve body to normally tightly seat thereagainst and thereby seal the openings at the outer ends of radial passages 17, as shown on FIGS. 2 and 3. Further, when balloon 11 is assembled together with valve 12, as described above, balloon neck N is stretched across groove or undercut 21.

As previously indicated, balloon assembly 10 is intended to be adapted for dispensing from a vending machine, for example, of the type disclosed in U.S. Pat. No. 3,414,123, identified more fully above. The foregoing is achieved by providing an elongated, flexible belt or web B formed with openings or apertures spaced apart along the belt and having balloon assemblies 10 releasably held in such apertures by frictional engagement of the edge of each aperture with the related balloon neck extending over a valve. In a vending machine of the described type, the flexible belt B carrying balloon assemblies 10 is intermittently advanced from a storage receptacle so that, during each dispensing cycle, the open end 16 of a valve 12 is aligned with and engageable by an inflating nozzle I (FIG. 4) through which gases under pressure are delivered for inflating the balloon having its neck engaged over such valve. After each balloon is inflated, the respective balloon assembly is separated from the belt B, for example, by movement imparted to the inflating nozzle I in the downward direction as viewed on FIG. 4, so as to knock-out from the aperture of the belt B both the balloon neck N and the valve 12 engaged therein for retaining the inflating gases within the balloon.

Figure 3:
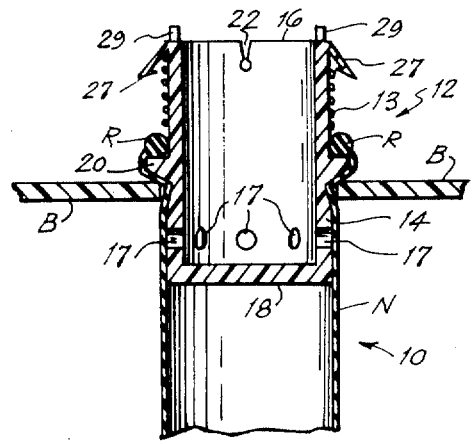
FIG. 3 is an axial sectional view of the valve.
Figure 2:
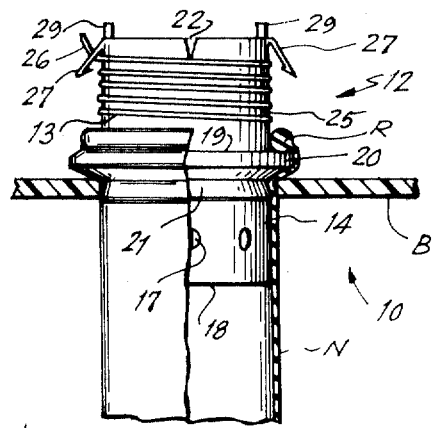
FIG. 2 is an enlarged elevational view of the valve of the balloon assembly with the balloon neck engaged thereon and shown partly broken away and in section.
Figure 4:
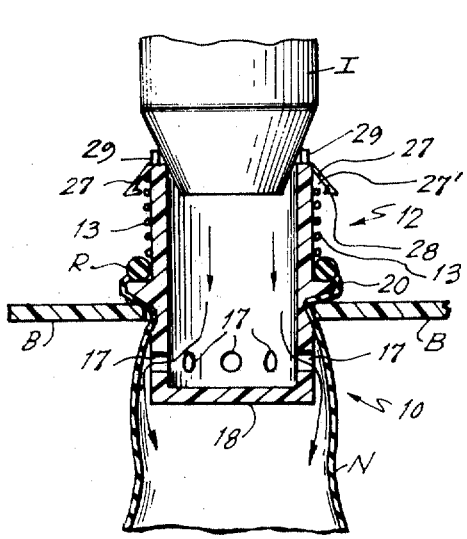
FIG. 4 is a view similar to that of FIG. 3, but showing the action of the valve during the inflating of the balloon.

As shown on FIGS. 2, 3 and 4, each aperture of the carrier belt B is dimensioned so that the edge of such aperture will engage or snap lightly into recess or groove 21 of valve body 14 and thereby press the balloon neck into such recess so long as the balloon assembly is carried by the belt.

As is shown in FIG. 4, when gases under pressure are supplied to bore 15 by the inflating nozzle I engaging or seating in the open end 16 of the valve body, the gases under pressure act radially outward through passages 17 to deflect balloon neck N away from the outer surface of valve body 14 and thereby permit the flow of the gases under pressure into the balloon for inflating the latter. By reason of the formation of shoulder 19 on flange 20, balloon neck N is stretched less tightly in the region of the openings of radial passages 17 than in the region of shoulder 19, whereby the balloon neck will flare away from the outer surface of the valve body in the downward direction, as viewed on FIG. 4, to permit the inflating gases to enter the balloon, rather than seeking to travel upwardly between the balloon neck and the valve body toward the mouth of the balloon. The foregoing serves to reduce the tendency of the inflating gases, even when under relatively high pressure, to effect separation of the balloon from the associated valve. The engagement of the thickened rim R at the mouth of the balloon over flange 19, and particularly the deflection or pressing of the balloon neck into groove or recess 21 by the edge or margin of the aperture in belt B, further serve to positively prevent separation of the balloon from the associated valve during inflation of the balloon. Thus, relatively high inflating pressure can be safely employed for effecting rapid inflation of each balloon, as is obviously desirable in a dispensing or vending machine.

When the balloon 11 is inflated to the extent desired, the supply of gases under pressure to valve 12 through inflating nozzle I is halted, whereby balloon neck N returns to its normal position seated tightly against outer surface of the valve body and thus seals the openings of radial passages 17 for retaining the inflating gases within the balloon. Thereafter, the balloon assembly may be separated from the belt, for example, by downwardly displacing inflating nozzle I, as viewed in FIG. 4, so that the action of the downwardly displaced nozzle against valve body 14 will serve to knock-out the valve body and the balloon neck engaged therewith from the aperture of belt B.

Figure 5:
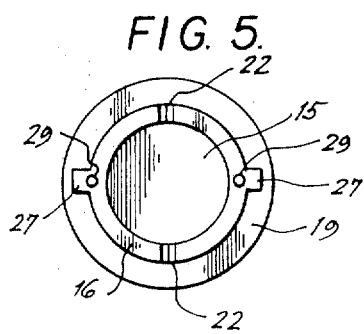
FIG. 5 is an end view of the valve.
Figure 6:
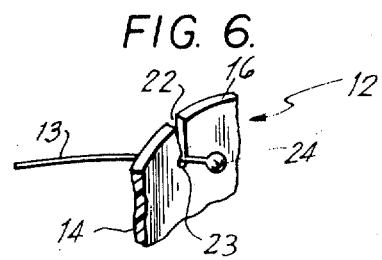
FIG. 6 is a fragmentary perspective view illustrating the attachment to the valve body of the cord or elongated flexible element by which the balloon may be held when inflated.

As shown particularly on FIGS. 3, 5 and 6, the edge of valve body 14, at its open end 16, may be formed with at least one V-shaped notch 22 opening, through a narrow gap at its bottom, into a radial hole 23 so that the flexible elongated element 13 may be pulled downwardly in notch 22 and squeezed through the narrow bottom gap into hole 23 which has a diameter larger than the bottom of the notch. An enlargement 24 (FIG. 6) is formed at an end of element 13 so as to be larger than hole 23 and thereby prevent the axial withdrawal of element 13 from such hole. Where the flexible element 13 is constituted by a length of string or the like, the enlargement 24 may be simply provided by a knot formed at one end of such string. However, if the element 13 is constituted by a length of nylon or other thermoplastic thread or filament, the enlargement 24 may be simply provided by a knot formed at one end of such string. However, if the element 13 is constituted by a length of nylon or other thermoplastic thread or filament, the enlargement 24 may be simply formed by heating the end of the filament either by heat applied to sever the filament into suitable lengths or by heat applied after the filament is cut or severed.

The elongated flexible element secured at one end to the valve body is wound on the outer surface portion 25 of the valve body between shoulder 19 and the open end 16, and the valve body is further provided with means by which the free end 26 (FIG. 2) of the elongated flexible element may be releasably retained for holding such element 13 in its wound condition on the valve body.

In the embodiment being described, the means for releasably retaining the free end 26 of element 13, is constituted by diametrically opposed ears 27 directed outwardly from the open end of valve body 14 at an acute angle with the surface portion 25 and each having a toothlike projection 28 at its free end directed inwardly toward surface portion 25. After the element 13 has been wound on surface portion 25, its free end portion 26 is pulled past a tooth-like projection 28 into the acutely angled notch-like space 27' enclosed by one or the other of the ears 27 so as to grip or retain such free end.

Thus, so long as the balloon assembiles 10 are carried by the belt B, the string or elongated flexible element 13 of each balloon assembly is closely wound and retained on the valve body 14 and cannot interfere with the movement of the balloon assemblies through the vending machine and the efficient dispensing of such assemblies. After the inflated balloon assembly has been dispensed, the free end 26 of the string or flexible elongated element 13 is simply pulled out of the space 27' enclosed by the ear 27 with which it has been engaged so that the string 13 can be unwound from the body 14, as shown on FIG. 1, and thereby adapted to hold the inflated balloon assembly to which the string remains secured by its engagement in hole 23.

If desired, lugs or pins 29 may project axially from the open end edge of body 14, for example, at diametrically opposed locations, as shown, for use in locating the valve 12 in automated equipment provided for the purpose of connecting and winding the cord or element 13 thereon.

Referring now to FIGS. 7 to 10, it will be seen that the balloon assembly 10a according to a second preferred embodiment of this invention again generally comprises a conventional balloon 11 of rubber or other elastic material, a valve 12a for retaining the balloon in its inflated condition after the balloon has been inflated by gases under pressure, for example, a mixture of helium and air, admitted to the balloon through the valve, and a string 13 (FIG. 10) secured at one end to valve 12a, as hereinafter described, to provide means by which the inflated balloon may be held.

The valve 12a of the preferred embodiment is shown to consist of a generally cylindrical, thin walled body 14a molded of a suitable plastic material and having an axial bore 15a (FIGS. 8 and 9) which opens at only one end 16a of valve body 14a. Radial passages 17a extend from bore 14a to openings at the outer surface of valve body 14a, which openings are located closer to the closed end 18a of the valve body than to open end 16a thereof. A first circumferential series of spaced apart flange sections 20a (FIGS. 7, 8 and 9) extend radially outward from body 14a at a location on the latter between the openings of radial passages 17a and open end 16a of the valve body to constitute shoulder defining means facing toward end 16a. Further, a second series of circumferentially spaced apart flange sections 30 is directed radially outward from body 14a and extends parallel to the series of flange sections 20a at a location between the openings of passages 17a and flange sections 20a to cooperate with the latter in defining radially outward opening recesses 21a therebetween.

The outer surface of valve body 14a, particularly between flange sections 20a and closed end 18a, is diametrically dimensioned so as to be substantially wider than the relaxed or molded diameter of the neck N of balloon 11 which has the usual thickened rim R extending around its open mouth. Thus, when valve body 14a is extended, at its closed end 18a, into the mouth of balloon 11 to an extent sufficient to engage the rim R over the shoulder constituted or defined by flange sections 20a, the balloon neck N is stretched around such outer surface of the valve body to normally tightly seat thereagainst and thereby seal the openings at the outer ends of radial passages 17a, as shown on FIG. 7. Further, when balloon 11 is assembled together with valve 12a, as described above, balloon neck N is stretched across each recess 21a defined between flange sections 20a and 30.

As in the first described embodiment, a plurality of balloon assemblies 10a are releasably held in spaced apart openings or apertures of an elongated, flexible belt or web B (FIGS. 7 and 10), with the edge of each belt opening or aperture frictionally engaging the related balloon neck extending over a valve at a circumferential zone corresponding to the recess or recesses 21a, and each opening or aperture of the carrier belt B being dimensioned so that its edge will engage or snap lightly into the recess or recesses 21a of valve body 14a and thereby press the balloon neck into such recess or recesses so long as the related balloon assembly 10a is carried by the belt.

As before, when gases under pressure are supplied to bore 15a, as by an inflating nozzle engaging or seating in open end 16a of the valve body, the gases under pressure act radially outward through passages 17a to deflect balloon neck N away from the outer surface of valve body 14a and thereby permit the flow of the gases under pressure innto the balloon for inflating the latter. The engagement of thickened rim R at the mouth of the balloon neck over flange sections 20a, and particularly the deflection or pressing of the balloon neck into the recess or recesses 21a by the edge of the aperture or opening in belt B, positively ensures that the pressure of the gases will not cause separation of the balloon from the associated valve during inflation of the balloon.

Figure 7:
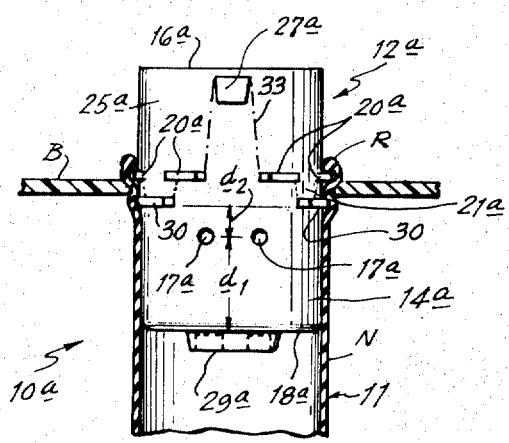
FIG. 7 is an enlarged elevational view of a balloon assembly according to another embodiment which is preferred, and in which the balloon neck and belt are shown in section.

The secure retention of the balloon neck on valve body 14a during inflation of the balloon that results from the engagement of the edge of the opening or aperture in the belt B with the balloon neck on the valve body, as described above, is particularly important when the openings of radial passages 17a are located so that the distance $d_1$ from such openings to closed end 18a of the valve body is made substantially larger than the distance $d_2$ from such openings to the location of flange sections 30a on the valve body, as shown particularly on FIG. 7. Preferably, in accordance with this invention, the ratio of $d_1/d_2$ is approximately 5/2 so that, after the balloon 11 is inflated, there is a relatively large area of the outer surface of valve body 14a between closed end 18a and the openings of passages 17a at which balloon neck N can engage the surface of valve body 14a for preventing the leaking of the inflating gases out of the balloon through passages 17a. Such large area of sealing contact of the balloon neck with the surface of valve body 14a is of particular importance when the inflating gases include helium as the latter is rather difficult to seal. It will be apparent that, with the openings of passages 17a located as described, to provide the necessary large area of sealing contact for retaining helium within the inflated balloon, a relatively high inflating pressure has to be employed and there will be an increased tendency, during inflation, for the gases under pressure acting through passages 17a to seek escape between the balloon neck and the surface of valve body 14a in the direction toward the mouth of the balloon neck. Such undesired escape of the inflating gases is avoided by the engagement of the belt B around the balloon neck above passages 17a during inflation, and further by the above indicated ratio of the distances $d_1$ and $d_2$. In a specific example of the valve 12a according to this invention, the distances $d_1$ and $d_2$ are approximately 5/16 and 1/8 inches, respectively.

After inflation of the balloon, the balloon assembly 10a can be disengaged or removed from belt B, in the manner previously described.

The valve body 14a, as shown, is molded with diametrically opposed ears 27a directed outwardly from open end 16a of the valve body at a small angle to the adjacent outer surface portion 25a of the valve body. In securing one end of the string 13 to valve body 14a, such end of the string, preferably with hot melt applied thereto, is inserted between one of the ears 27a and the adjacent surface portion 25a, whereupon such ear is deformed by the application of heat and pressure to merge with the adjacent surface portion 25a, as at 27'a on FIG.

10, whereby to securely lock the engaged end of string 13. Thereafter, the unused ear 27a may be sheared off, as shown on FIG. 10, and the string wound about the surface portion 25a with the free end portion of string 13 being releasably secured, as by hot melt 31, to adhesively retain the string in its wound condition.

Thus, so long as the balloon assemblies 10a are carried by the belt B, the string 13 of each balloon assembly is closely wound and retained on the valve body 14a and cannot interfere with the movement of the balloon assemblies through the vending machine and the efficient inflation and dispensing of such assemblies.

The valve body 14a, as shown, may further have a locating lug 29a extending diametrically across its closed end 18a for use in locating the valve 12a in automated equipment that may be provided for the purpose of connecting and winding the string 13a thereon.

As previously mentioned, valve body 14a is of thin-walled construction, for example, with a wall thickness of about .025 inch, so as to minimize the weight of the valve body and thereby reduce the amount of relatively expensive helium that must be employed for inflating the balloon if the assembly 10a is to be made lighter than air. However, when the thickness of the walls of valve body 14a is thus minimized, there is the possibility that, in molding the valve body from a suitable plastic, the necessary accuracy of the passages 17a and the smoothness of the outer surface at the openings from such passages will not be preserved. Thus, in valve body 14a according to this invention, passages 17a are located, in pairs, at diametrically opposed portions of the side wall of valve body 14a and such diametrically opposed portions of the side wall are locally thickened, as at 32 (FIGS. 8 and 9).

Figure 8:
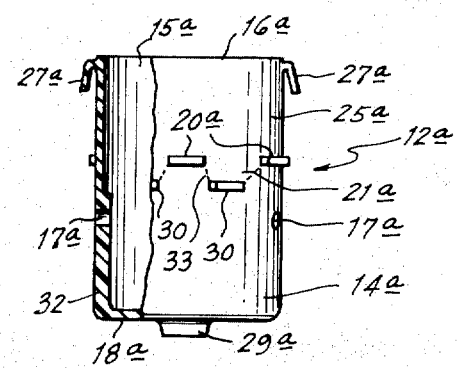
FIG. 8 is an elevational view, partly broken away and in section, of the valve included in the balloon assembly of FIG. 7, and which is shown as viewed from a direction at right angles to direction of viewing on FIG. 7.
Figure 9:
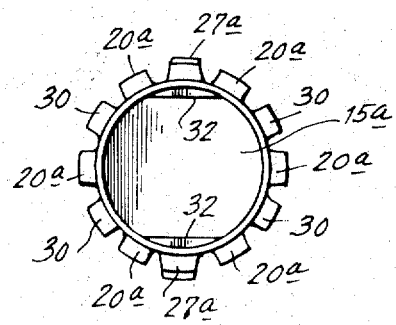
FIG. 9 is an end elevational view of the valve of FIG. 8.
Figure 10:
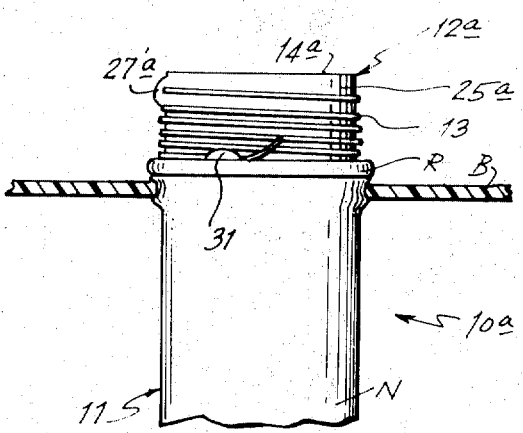
FIG. 10 is an elevational view of the balloon assembly of FIG. 7, and showing the manner in which the string thereof is secured to the valve and retained in wound condition thereon.

Further, in order to facilitate the molding of valve body 14a and as shown particularly on FIG. 9, spaced apart flange sections 20a, spaced apart flange sections 30 and ears 27a are all staggered with respect to each other in the circumferential direction to permit molding of the valve body by two mold parts (not shown) which are separable from each other at a separation plane indicated by the dot-dash line 33 on FIGS. 7 and 8. Thus, it will be apparent that the relative positioning of flange sections 20a and 30 and of ears 27a in the circumferential direction is dictated by molding considerations and that, if a more complex mold construction is justified, flange sections 20a and flange sections 30 may be replaced respectively by continuous external flanges directed radially outward from valve body 14a.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. For use in a balloon dispensing machine, the combination of an elongated flexible belt having a plurality of openings at locations spaced apart along the belt, and balloon assemblies releasably mounted in said openings of the belt and each comprising an elastic balloon including a neck with an open mouth having a thicknened rim, and a valve for said balloon consisting of a one-piece generally cylindrical body having an axial bore opening only at one end of the body and radial passages extending from said bore and having openings at the outer surface of said body closer to the other end thereof than to said one end of the body, said body further having external shoulder defining means directed radially outward between said openings of the radial passages and said one end, the portion of said body between said other end and said shoulder defining means extending into said neck of the balloon with said thickened rim engaging over said shoulder defining means to strongly retain the balloon on said valve with said neck of the balloon normally elastically seating against said outer surface of said portion of the body for sealing said openings of the radial passages and being deflectable away from said openings when gas under pressure is supplied to said bore for inflating the balloon through said passages, each of said balloon assemblies having said neck of its balloon frictionally engaged by the edge of the respective belt opening at a circumferential zone corresponding to a location on said body of the associated valve between said openings and said shoulder defining means so that, during said inflating of the balloon, such frictional engagement further prevents removal of the balloon neck from the valve body by the pressure of the inflating gas whereupon the inflated balloon can be separated from said belt and maintained in inflated condition by the associated valve, and in which each of said balloon assemblies further comprises an elongated flexible element permanently secured, at one end, to the respective valve body adjacent said one end of the latter, said flexible element being wound on said outer surface of the valve body extending out of said neck of the associated balloon, and means releasably holding said flexible element in its wound condition on said valve body.

2. For use in a balloon dispensing machine, the combination of an elongated flexible belt having a plurality of openings at locations spaced apart along the belt, and balloon assemblies releasably mounted in said openings of the belt and each comprising an elastic balloon including a neck with an open mouth having a thickened rim, and a valve for said balloon consisting of a one-piece generally cylindrical body having an axial bore opening only at one end of the body and radial passages extending from said bore and having openings at the outer surface of said body closer to the other end thereof than to said one end of the body, said body further having shoulder defining means directed radially outward between said openings of the radial passages and said one end, the portion of said body between said other end and said shoulder defining means extending into said neck of the balloon with said thickened rim engaging over said shoulder defining means to strongly retain the balloon on said valve with said neck of the balloon normally elastically seating against said outer surface of said portion of the body for sealing said openings of the radial passages and being deflectable away from said openings when gas under pressure is supplied to said bore for inflating the balloon through said passages, each of said balloon assemblies having said neck of its balloon frictionally engaged by the edge of the respective belt opening at a circumferential zone corresponding to a location on said body of the associated valve between said openings and said shoulder defining means so that, during said inflating of the balloon, such frictional engagement further prevents removal of the balloon neck from the valve body by the pressure of the inflating gas whereupon the inflated balloon can be separated from said belt and maintained in inflated condition by the associated valve, and in which the distance along the valve body from said openings of the radial passages to said other end of the body is substantially greater than the distance along the valve body from said openings to said location of the circumferential zone where the balloon neck is frictionally engaged by said edge of the belt opening.

3. The combination according to claim 2, said distances along the valve body from said openings to said other end and to said location of said circumferential zone are substantially in the ratio 5/2.

4. The combination according to claim 3, in which said outer surface of each valve body further has means defining a radially outward opening recess at said location corresponding to said circumferential zone and into which the balloon neck is urged by said frictional engagement by the edge of the respective belt opening.

5. A balloon assembly comprising an elastic balloon including a neck with an open mouth having a thickened rim; and a valve for said balloon consisting of a one-piece generally cylindrical body having an axial bore opening only at one end of the body and radial passages extending from said bore and having openings at the outer surface of said body closer to the other end thereof than to said one end of the body, said body further having external shoulder defining means directed radially outward between said openings of the radial passages and said one end and radially outward recess defining means located between said external shoulder and said openings, the portion of said body between said other end and said shoulder defining means extending into said neck of the balloon with said thickened rim engaging over said shoulder defining means to retain the balloon on said valve with said neck extending across said recess defining means and normally elastically seating against said outer surface of the body for sealing said openings of the radial passages and being deflected away from said openings when gas under pressure is supplied to said bore for inflating the balloon through said passages, and in which the balloon neck engaging said outer surface for distances along the valve body from said openings to said other end of the body and to said recess defining means, respectively, which are substantially in the ratio 5/2 whereby to ensure the effective sealing of the inflating gas when the latter includes helium.

6. A balloon assembly according to claim 5, in which said shoulder defining means is constituted by a circumferential series of spaced apart flange sections projecting from said body.

7. A balloon assembly according to claim 6, in which said means defining a radially outward opening recess includes a second circumferential series of spaced apart flange sections projecting from said body and spaced from the first mentioned series of flange sections to define said recess therebetween.

8. A balloon assembly according to claim 7, in which said flange sections of said second series are staggered with respect to the flange sections of said first series.

9. A balloon assembly according to claim 5, further comprising an elongated flexible element permanently secured, at one end, to said valve body adjacent said one end of the latter, said flexible element being wound on said outer surface of the valve body extending out of said neck of the balloon, and means releasably holding said flexible element in its wound condition on said valve body.

References Cited

UNITED STATES PATENTS

| | | | |
|---|---|---|---|
| 3,380,490 | 4/1968 | Ellenberg et al. | 141—181 |
| 1,621,744 | 3/1927 | Lindley | 209—84 |
| 3,162,974 | 12/1964 | Jackson et al. | 46—90 |
| 3,174,455 | 3/1965 | Peterson | 46—90 |

FOREIGN PATENTS

| | | |
|---|---|---|
| 488,336 | 1/1930 | Germany. |

LOUIS G. MANCENE, Primary Examiner

J. O. LEVER, JR., Assistant Examiner